United States Patent [19]

Füssl et al.

[11] Patent Number: 4,534,731
[45] Date of Patent: Aug. 13, 1985

[54] PROCESS AND APPARATUS FOR CALCINING LIMESTONE

[75] Inventors: Erwin Füssl, Zurich; Max Ranner, Stallikon, both of Switzerland

[73] Assignee: Maerz Ofenbau AG, Zurich, Switzerland

[21] Appl. No.: 513,046

[22] Filed: Jul. 12, 1983

[30] Foreign Application Priority Data

Jul. 12, 1982 [AT] Austria ............................ 2700/82

[51] Int. Cl.³ .................. F27B 15/00; F27D 1/08; F27D 17/00
[52] U.S. Cl. ........................ 432/14; 432/95; 432/180
[58] Field of Search ............ 432/95, 96, 180, 14; 75/30

[56] References Cited

U.S. PATENT DOCUMENTS

| 791,660 | 6/1905 | Walzel | 432/96 |
| 2,688,535 | 9/1954 | Madaras | 75/30 |
| 4,315,735 | 2/1982 | Fussl et al. | 432/96 |

FOREIGN PATENT DOCUMENTS 1259603  1/1972  United Kingdom ............... 432/14

Primary Examiner—John J. Camby
Attorney, Agent, or Firm—Toren, McGeady, Stanger, Goldberg & Kiel

[57] ABSTRACT

In a parallel flow regenerative shaft furnace having at least two furnace shafts and a transfer duct interconnecting the furnace shafts, limestone and similar mineral raw materials are calcined by operating the furnace shafts alternately, one as a calcining or parallel flow shaft and the other as a counterflow shaft, with burnt lime being discharged uncooled at the lower end of a calcining zone of the particular calcining shaft.

5 Claims, 1 Drawing Figure

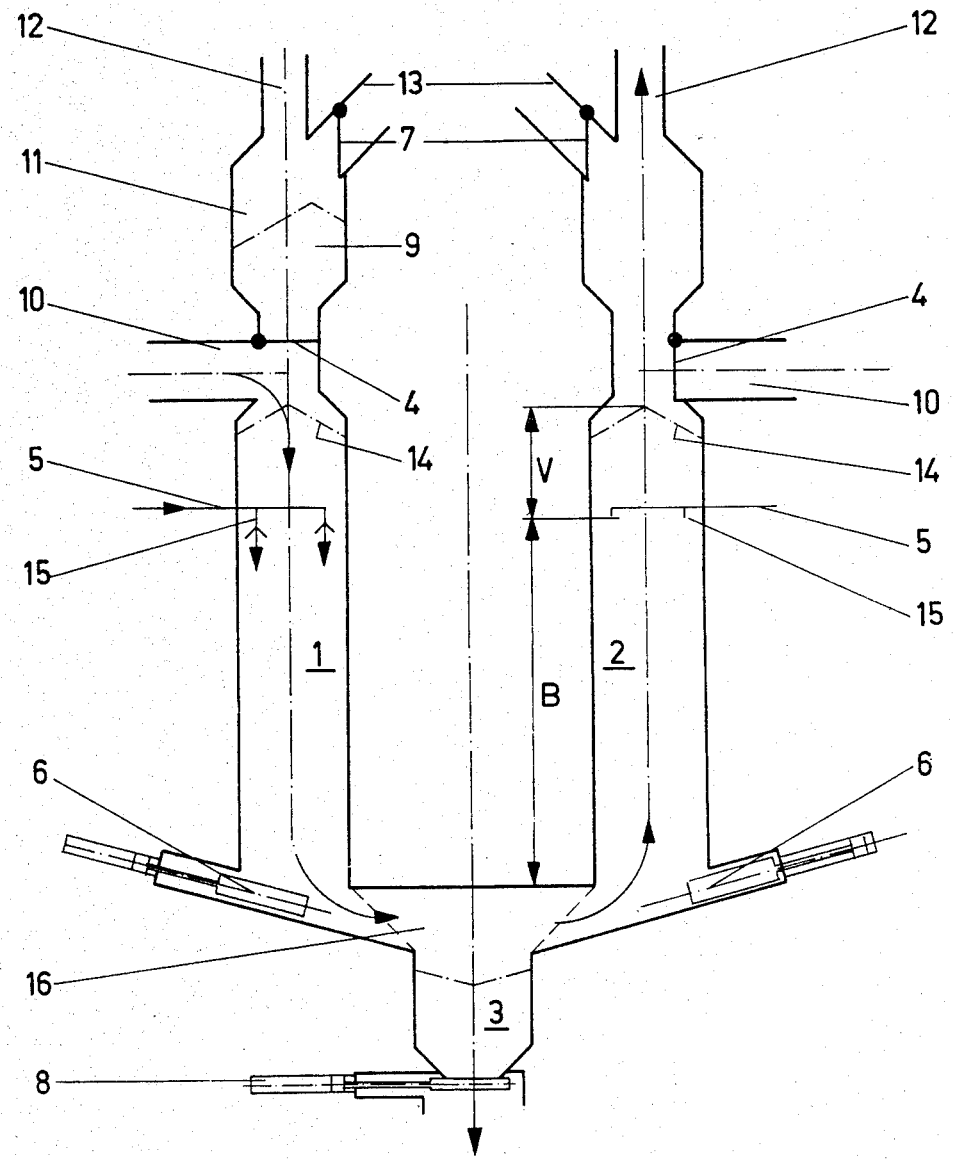

PROCESS AND APPARATUS FOR CALCINING LIMESTONE

The present invention relates generally to a process and apparatus for the calcining of limestone and similar mineral raw materials. More particularly, the invention relates to the performance of such processes in a parallel flow regenerative shaft furnace having at least two shafts which are interconnected by a transfer duct wherein one shaft is operated as a calcining or parallel flow shaft and the other shaft is operated as a counterflow shaft.

In the calcining of limestone or similar raw materials in parallel flow processes generally known from the prior art, for example from Austrian Pat. No. 211 214, shaft furnaces are used having calcining shafts which, when considered from top to bottom, include a preheating zone, a calcining zone, and a cooling zone. It is known in this connection to associate a cooling zone with each of the calcining shafts of the furnace. However, it is also known, for example in the case of the shaft furnace having two shafts, to provide a common cooling zone located beneath both shafts.

However, in such a construction, the cooling zone forms an integral part of the shaft furnace. Cooling air preheated in this cooling zone is drawn off upwardly in the regenerative counterflow shaft and is mixed in an overflow duct or a ring duct with gases coming from the parallel flow shaft, i.e., flue gases and carbon dioxide expelled from the limestone.

It has been proposed to utilize the hot cooling air from the cooling zones positioned below the calcining shafts for combustion purposes. However, the above-mentioned processes exhibit several disadvantages. Thus, when hot cooling air flows through the counterflow shaft, there is in many cases an unavoidable, undesired enrichment of the flue gases with oxygen and a depletion of the $CO_2$ concentration in the flue gas. Additionally, electrical power consumption is higher.

Furthermore, considerable problems arise with the circulation of the hot, dust-containing cooling air, and it is difficult to control different pressure and/or draft conditions in the furnace system. An additional characteristic of the known processes is that the burnt lime is discharged cold from the furnace.

The present invention is directed toward development of a process of the aforementioned type which, accompanied by simultaneous simplification of the shaft furnace construction, operates to avoid the aforementioned disadvantages and particularly the enrichment of flue gases with oxygen.

SUMMARY OF THE INVENTION

Briefly, the present invention may be described as an improvement in a process for calcining limestone and similar raw materials in a parallel flow regenerative shaft furnace having at least two furnace shafts each defining a calcining zone and a transfer duct interconnecting the furnace shafts, said furnace shafts being operated alternately, one as a calcining or parallel flow shaft and the other as a counterflow shaft, the improvement comprising that burnt lime is discharged uncooled at the lower end of the calcining zone of the particular calcining shaft.

Thus, in accordance with the present invention, the problems described above are overcome in that the burnt lime is directly discharged hot from the calcining shafts.

The invention also covers a parallel flow regenerative shaft furnace for performing the process wherein each shaft has a preheating zone and a calcining zone.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

DESCRIPTION OF THE DRAWING

The single FIGURE of drawing is a schematic diagram showing a parallel flow regenerative shaft furnace structured in accordance with the invention and adapted to utilize the process of the invention.

DETAILED DESCRIPTION OF THE PREFERRED EMBODIMENT

Referring now to the drawing, there is shown a parallel flow regenerative shaft furnace used for calcining limestone and similar raw materials which is operative to utilize the process of the invention. The furnace shown in the drawing has two shafts 1 and 2, with the shaft 1 representing the parallel flow or calcining shaft and with the shaft 2 constituting the counterflow or regenerative shaft. The throat or upper end of the shaft 1, 2 comprises a supply pipe for combustion air supply and it may be closed by an air-flue gas flap or valve 4.

In the case of the shaft 1, the air-flue gas flap 4 closes the access to the shaft 1 from a charging container 11 for receiving a limestone charge 9. The charging container 11 has an outlet pipe 12 for flue gases as well as a charging opening 13 which may be closed by a charging flap 7.

In the shaft 2, the supply pipe 10 is closed by the air-flue gas flap 4. Flue gases rising through the counterflow shaft 2 indicated by the arrow in the drawing are drawn off through the outlet pipe 12. Shafts 1, 2 are subdivided into a preheating zone V and a calcining zone B. The preheating zone V extends from the upper edge of a packed bed 14 to fuel inlet openings 15 of a a fuel supply system 5, and calcining zone B from openings 15 to a transfer duct 16.

At the lower end of each shaft 1, 2, i.e., directly at the lower end of the calcining zone B, there is a discharge mechanism 6 which may, for example, be a hydraulically driven slide member. The discharge mechanism 6 operates to discharge burnt lime hot from the shafts 1, 2 into a container 3. The container 3 is emptied by means of, for example, a hydraulically driven slide 8 or by means of a flap.

It is important that shaft 1, 2 only comprises a preheating zone V and a calcining zone B with no cooling zone being provided. Alternatively, if a cooling zone is desired, it is maintained separate from the actual furnace itself. The burnt lime is consequently discharged hot from the furnace and may be used directly for other processes such as the production of ferro alloys or carbide while utilizing its sensible heat.

However, if the lime which is emptied hot from the furnace is to be cooled, this may take place in a cooling mechanism such as, for example, in a shaft cooler, a rotary cooler, or some other type of cooler. The cooling air heated during the cooling process can be further used in many different ways, for example for combustion at the end of the preheating zone V accompanied by optionally admixing of cold air, or for recuperative preheating of combustion air, or for preheating the limestone, for example in a brick silo or bunker in front of the shaft furnace.

The fuel for calcining limestone may be a gaseous liquid or solid fuel which is introduced through the openings 15 at the end of the preheating zone.

The operation and construction of the shaft furnace of the invention are simplified by the elimination of a cooling zone. Even if it is not possible to eliminate a subsequent cooling of the hot lime which is discharged, it is possible to use a corresponding device independently of the shaft furnace. However, the guidance of the fuel gases through the counterflow shaft and the setting of draft conditions are greatly simplified as compared with conventional shaft furnaces which include a cooling zone.

Thus, the process of the invention for calcining limestone and similar raw materials may be operated in a parallel flow regenerative shaft furnace having at least two shafts interconnected by a transfer zone, whereof alternately one shaft is operated as a calcining shaft or parallel flow shaft and the other as a counterflow shaft. As indicated by the foregoing, the burnt lime is discharged uncooled at the lower end of the calcining zone of the particular calcining shaft, and in the parallel flow regenerative shaft furnace for performing the process, each shaft is provided with only a preheating zone, a calcining zone, and a discharge means at the shaft end, with the cooling zone being eliminated from the furnace itself.

While a specific embodiment of the invention has been shown and described in detail to illustrate the application of the inventive principles, it will be understood that the invention may be embodied otherwise without departing from such principles.

What is claimed is:

1. In a process for calcining limestone and similar mineral raw material in a parallel flow regenerative shaft furnace having at least two furnace shafts each being designed to define only a calcining zone and a preheating zone with a transfer duct interconnecting said furnace shafts, said furnace shafts being operated alternately one as calcining or parallel flow shaft and the other as a counterflow shaft, the improvement comprising discharging burnt lime from said furnace uncooled at the lower end of the calcining zone of the one of said shafts operating as the calcining shaft.

2. A process according to claim 1 wherein said burnt lime discharged hot from said calcining shaft is cooled separately from said shaft furnace.

3. A parallel flow regenerative shaft furnace for calcining limestone and similar raw materials comprising at least two furnace shafts and a transfer duct interconnecting said furnace shafts, said furnace shafts being alternating operated one as a calcining or parallel flow shaft and the other as a counterflow shaft, said furnace being structured with each of said shaft consisting essentially of only a preheating zone, a calcining zone, and discharge means at the shaft end, said furnace being operated to discharge burnt lime uncooled from said furnace at the lower end of said calcining zone of the one of said shafts being operated as the calcining shaft.

4. A furnace according to claim 3 wherein said discharge means is positioned directly at the lower end of said calcining zone.

5. A furnace according to claim 4 wherein said discharge means have a common container positioned therebelow for both shafts.

* * * * *